United States Patent [19]

Sato

[11] Patent Number: 4,796,438
[45] Date of Patent: Jan. 10, 1989

[54] METHOD AND APPARATUS FOR CONTROLLING AN AUTOMOTIVE AIR CONDITIONING SYSTEM

[75] Inventor: Kenichiro Sato, Isesaki, Japan

[73] Assignee: Sanden Corporation, Gunma, Japan

[21] Appl. No.: 114,013

[22] Filed: Oct. 29, 1987

[30] Foreign Application Priority Data

Oct. 29, 1986 [JP] Japan .............................. 61-164918[U]

[51] Int. Cl.⁴ .............................................. B60H 1/32
[52] U.S. Cl. ...................................... 62/133; 62/228.5
[58] Field of Search ................... 62/133, 228.4, 228.5, 62/229

[56] References Cited

U.S. PATENT DOCUMENTS

| | | | |
|---|---|---|---|
| 4,102,150 | 7/1978 | Kountz | 62/209 |
| 4,103,506 | 8/1978 | Adalbert et al. | 62/228.5 X |
| 4,326,386 | 4/1982 | Tamura | 62/150 |
| 4,358,936 | 11/1982 | Ito et al. | 62/229 |
| 4,379,483 | 4/1983 | Farley | 165/2 |
| 4,379,484 | 4/1983 | Lom et al. | 165/16 |
| 4,395,203 | 7/1983 | Takada | 417/282 |
| 4,471,632 | 9/1984 | Nishi et al. | 62/208 |
| 4,485,634 | 12/1984 | Yasuda et al. | 62/196.2 |
| 4,485,635 | 12/1984 | Sakano | 62/209 |
| 4,510,764 | 4/1985 | Suzuki | 62/133 |
| 4,539,821 | 9/1985 | Tamura | 62/228.5 |
| 4,582,124 | 4/1986 | Yoshimi et al. | 165/28 |
| 4,633,675 | 1/1987 | Sato | 62/208 |

FOREIGN PATENT DOCUMENTS

| | | | |
|---|---|---|---|
| 5310054 | 6/1980 | Japan | 62/133 |
| 56-30549 | 3/1981 | Japan | |
| 56-112314 | 8/1981 | Japan | 62/133 |
| 58-30 | 1/1983 | Japan | |
| 58-43340 | 3/1983 | Japan | |
| 59-53225 | 3/1984 | Japan | |

Primary Examiner—William E. Wayner
Attorney, Agent, or Firm—Banner, Birch, McKie & Beckett

[57] ABSTRACT

A method and apparatus including a control device for controlling an automotive air conditioning system is disclosed which includes a temperature detecting sensor disposed in proximity to the air conditioning system, an acceleration detecting device for detecting acceleration of an automobile and a control unit. The control unit compares the detected air temperature with predetermined temperatures and controls the capacity of the compressor in accordance with the compared results and the acceleration condition of the automobile. Therefore, the temperature in a compartment of this automobile can be maintained at a comfortable level and the power load imposed on the automobile engine can be reduced by operating the compressor at a reduced capacity.

4 Claims, 2 Drawing Sheets

| AIR TEMP. T BY THERMISTOR | ELECTROMAGNETIC CLUTCH | ACCELERATION DETECTING DEVICE | CAPACITY OF COMP. |
|---|---|---|---|
| $T_1 < T$ | ON | OFF | LARGE |
| | | ON | SMALL |
| $T_0 < T < T_1$ | ON | OFF | SMALL |
| | | ON | SMALL |
| $T < T_0$ | OFF | — | — |

| AIR TEMP. T BY THERMISTOR | ELECTROMAGNETIC CLUTCH | ACCELERATION DETECTING DEVICE | CAPACITY OF COMP. |
|---|---|---|---|
| $T_1 < T$ | ON | OFF | LARGE |
|  |  | ON | SMALL |
| $T_0 < T < T_1$ | ON | OFF | SMALL |
|  |  | ON | SMALL |
| $T < T_0$ | OFF | — | — |

//4,796,438

METHOD AND APPARATUS FOR CONTROLLING AN AUTOMOTIVE AIR CONDITIONING SYSTEM

TECHNICAL FIELD

This invention relates to a method and apparatus for controlling an automotive air conditioning system, and more particularly, to an improved control device for controlling an automotive air conditioning system comprising a compressor having a variable displacement mechanism.

BACKGROUND OF THE INVENTION

Automotive air conditioning systems are well known in the prior art. The operation of such automobile air conditioning systems is normally controlled by a control device in accordance with the change of temperature in the passenger compartment of an automobile. Such air conditioning systems include a compressor provided with temperature compensation means to compensate for temperature changes in an automobile compartment. The control device of prior art automobile air conditioning systems controls the magnetic clutch of the compressor and a temperature compensation means to compensate for the actual temperature in the compartment in accordance with a predetermined desired temperature.

Typically, the automobile engine is used to drive the compressor of the automobile air conditioning system. Driving this compressor places a large load on the engine which increases engine strain and reduces the energy efficiency of the engine. This reduced energy efficiency obviously results in increased fuel consumption and decreased fuel efficiency. It is, therefore, desirable to reduce the load placed on the engine while still maintaining a comfortable temperature in the automobile compartment.

When the automobile is accelerated, a large load is imposed on the automobile engine. If an automobile is being accelerated while the compressor of the automobile air conditioning system is being driven by the engine, an even greater load is imposed on the engine. Prior art control devices have been provided with a sensor to detect the acceleration of an automobile and to control the operation of compressor in accordance therewith. That is, the operation of the compressor is stopped when it is detected that the automobile is being accelerated. However, since the control device terminates the operation of the compressor, the temperature in the compartment will remain at an undesired level until acceleration of the automobile is no longer detected. In city traffic, for example, a car may often accelerate and decelerate thereby causing the compressor to remain off very frequently.

The prior art attempts to reduce the load imposed on an automobile engine due to simultaneous acceleration of the automobile and operation of an automobile air conditioning compressor which is driven by that engine. However, since the prior art solution to this entails terminating the operation of the compressor and air conditioning system, the prior art fails to effectively solve the real problem, that is, controlling the temperature of the automobile compartment to be within a predetermined range.

SUMMARY OF THE INVENTION

It is an object of this invention to overcome the aforestated problems of the prior art.

It is another object of this invention to provide an apparatus that is suitable for use in an automobile air conditioning system that can maintain the operation of a compressor while an automobile is accelerated while reducing the load imposed on the engine.

It is another object of this invention to provide a method for controlling the operation of an automobile air conditioning system to maintain the operation of a compressor while an automobile is being accelerated and reduce the load imposed on the engine.

The above objects of this invention are achieved by providing a control device which includes a temperature detecting sensor to detect the air temperature in an air conditioning system, an acceleration detecting device for detecting the acceleration condition of an automobile and a control unit. In operation, the control unit compares the detected air temperature with predetermined temperatures and controls a capacity control mechanism of the compressor in accordance with the results of the comparisons. The control unit also controls the capacity control mechanism to operate the compressor at less than full capacity when the acceleration detecting device detects a predetermined acceleration condition.

Further objects, features and other aspects of this invention will be understood from the following detailed description of the preferred embodiments of this invention with reference to the annexed drawings.

DETAILED DESCRIPTION OF THE PREFERRED EMBODIMENT

Figures 1, 2:
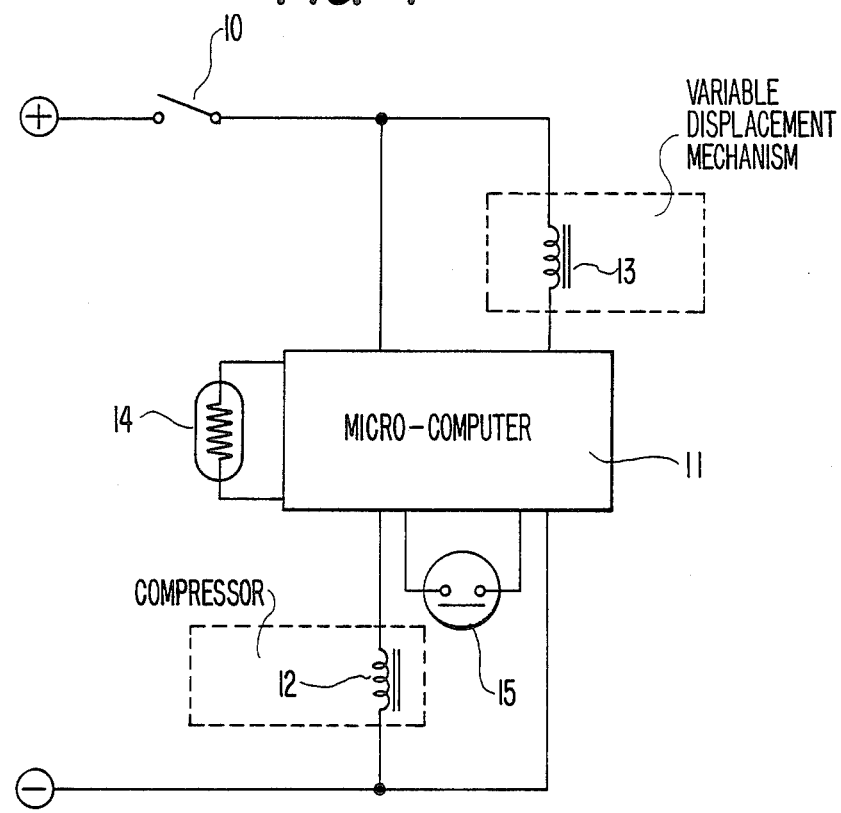
FIG. 1 is a schematic circuit diagram of a control device for controlling the operation of an automotive air conditioning system in accordance with one embodiment of this invention.
FIG. 2 is a table illustrating the operation of an automotive air conditioning system in correspondence with various temperature conditions in an automobile compartment.

Referring to FIG. 1, a schematic circuit diagram of a control device for an automotive air conditioning system in accordance with a preferred embodiment of this invention is shown. The circuit includes electric power switch 10, micro-computer 11 and electromagnetic clutch 12 which cooperates with a compressor to control the operation of the compressor. Switch 10 is connected on one side to a terminal of a power source. The other side of switch 10 is connected to micro-computer 11 and solenoid valve 13. Solenoid valve 13 is part of a conventional variable displacement mechanism. The other side of solenoid valve 13 is connected to micro-computer 11. Micro-computer 11 is also connected to thermistor 14 to detect the air temperature at the outlet of an evaporator (not shown) of an air conditioning system. An acceleration detecting device 15 is also connected to micro-computer 11 to detect the acceleration condition of an automobile and to control the operation of the air conditioning system in accordance therewith. The electromagnetic clutch 12 is connected on one side to the micro-computer 11 and on the other side to a terminal of a power source. The micro-computer 11 is also connected to this terminal of a power source.

Micro-computer 11 is loaded with temperature values that are selected in accordance with a desired temperature in a manner that would be obvious to one of ordinary skill in the art. Specifically, $T_0$ represents a lowest desirable temperature for air at the outlet side of the evaporator (not shown) and $T_1$ represents the highest desirable temperature of air at the outlet side of the evaporator.

Figure 3:
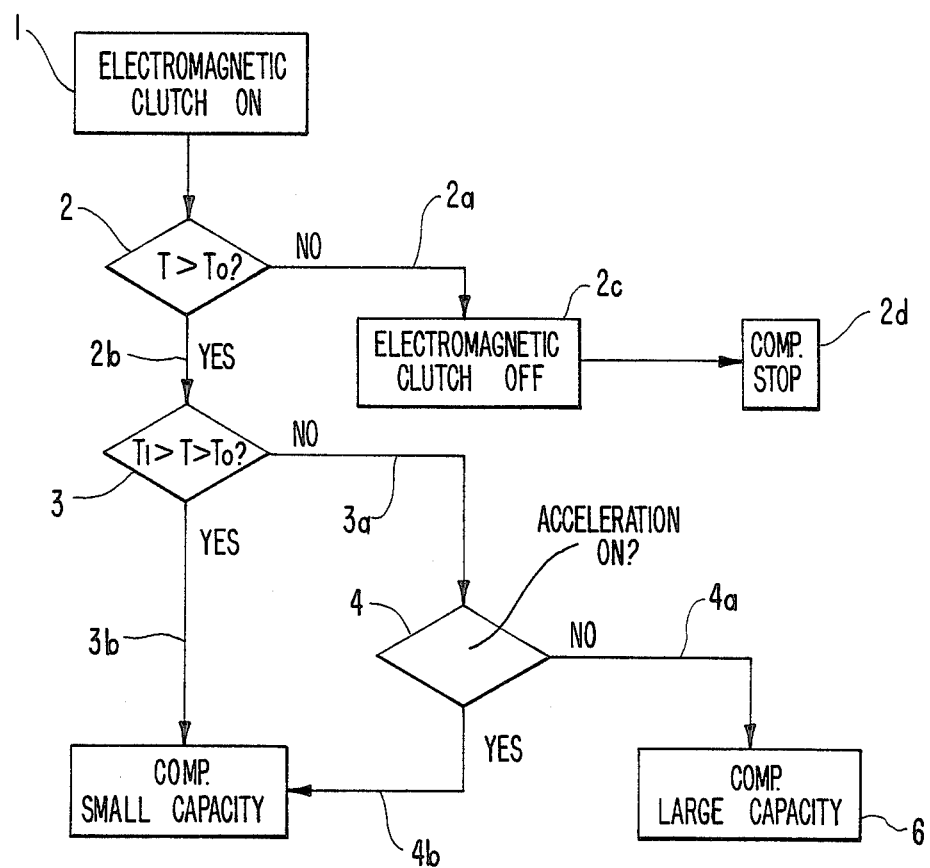
FIG. 3 is a flow chart illustrating the operation of the control device in FIG. 1.

With reference to FIGS. 2 and 3, the operation of the automotive air conditioning system and the control device of the compressor will now be described. When conventional electric power switch 10 is closed, electromagnetic clutch 12 is energized (step 1) and the compressor associated therewith is operated at full capacity. Simultaneously, the air temperature T at the outlet of the evaporator is detected by thermistor 14, and is compared in a known manner with a first predetermined temperature $T_0$ that is stored in micro-computer 11 (step 2). If it is determined that air temperature T is lower than the first predetermined temperature $T_0$ (2a), micro-computer 11 provides a control signal to turn electromagnetic clutch 12 off (2c), and the operation of the compressor is stopped (2d). If it is determined that the air temperature T is higher than the predetermined temperature $T_0$ (2b), the operation progresses to step 3.

In step 3, the air temperature T is compared with the first predetermined temperature $T_0$ and a second predetermined temperature $T_1$. If air temperature T is determined to be within the range between first predetermined temperature $T_0$ and second predetermined temperature $T_1$ (3b), micro-computer 11 provides a control signal to solenoid valve 13 so that the compressor operates at a reduced capacity (5). If micro-computer 11 detects that the air temperature T is higher or lower than predetermined temperatures $T_1$ and $T_0$, respectively, that is, if T is not within the range between $T_0$ and $T_1$, the operation progresses to step 4.

In step 4, micro-computer 11 determines the condition of acceleration detecting device 15. When acceleration detecting device 15 is in the ON state, micro-computer 11 provides a control signal to solenoid valve 13 so that the compressor operates at a reduced capacity (5). When it is determined that acceleration detecting device 15 is not in the ON state (4a), micro-computer 11 provides a control signal to solenoid valve 13 so that the compressor operates at full capacity (6).

Solenoid valve 13 is provided to control a variable displacement mechanism that changes the capacity of the compressor. It is to be understood that full capacity is a relative term and is not to be literally construed. It is intended that full capacity refers to a normal operating capacity of a compressor used in an automobile air conditioning system. The term reduced capacity refers to an operating capacity of the compressor that is less than the full capacity but such that the compressor still operates, that is, the compressor operation is not terminated.

Thermistor 14 is a conventional thermistor and operates in a manner well known is one of ordinary skill in the art. Thermistor 14 is disposed in a conventional manner in proximity to the outlet of the evaporator of the air conditioning system.

Electromagnetic clutch 12 is of conventional design and is operatively connected to the compressor of the air conditioning system. The compressor operation capacity can be changed by the variable displacement mechanism.

Acceleration detecting device 15 is of conventional design and is operatively connected to micro-computer 11 in a known manner. While the acceleration detecting device may take many forms, it is preferred that it is capable of detecting when an automobile is accelerating and provide an output indication thereof. This output indication may also be considered to represent an ON-state of the acceleration detecting device. The microcomputer receives an output indication from the acceleration detection device 15 to determine the state thereof. The micro-computer may detect the ON-state or an absence of an ON-state indication to determine the acceleration condition of the automobile.

In this embodiment, the temperature in the compartment of the automobile is suitably controlled by changing the capacity of the compressor in accordance with both the air temperature at the outlet of the evaporator and the operating condition of the acceleration detecting device to provide a comfortable temperature level and to reduce the load imposed on the engine.

While this invention has been described in detail in connection with the preferred embodiment, it is to be understood that these are only examples and the invention is not restricted thereto. It will be recognized by those skilled in the art that other variations and modifications can be easily made within the scope of this invention.

I claim:

1. A control device for controlling the operating capacity of a compressor in an automobile air conditioning system comprising temperature detecting means for detecting air temperature, acceleration detecting means for detecting an accelerating condition of the automobile, and control means for controlling a variable displacement mechanism of said compressor, said control device including:

first comparison means for comparing a first predetermined temperature with a detected air temperature and providing a first control signal when the air temperature is higher than said first predetermined temperature, wherein the operation of said compressor is terminated in the absence of said first control signal, second comparison means for comparing a second predetermined temperature with said detected air temperature in response to the comparison by the first comparison means and the presence of said first control signal, said second comparison means providing a second control signal when said detected air temperature is higher than said second predetermined temperature, wherein said variable displacement mechanism causes said compressor to operate at a reduced capacity in the absence of said second control signal, means responsive to the detected acceleration condition of the automobile and the presence of said second control signal for causing said variable displacement mechanism to cause said compressor to operate at a reduced capacity upon the occurrence of a first acceleration condition and at full capacity upon the occurrence of a second acceleration condition.

2. The control device of claim 1 wherein said first acceleration condition occurs when said second control signal is generated and the detected acceleration condition of the automobile is higher than a predetermined threshold, and wherein said second acceleration condition occurs when said second control signal is generated and the detected acceleration condition of the automobile is lower than a predetermined threshold.

3. In an automobile air conditioning system comprising a compressor, temperature detecting means for detecting a temperature, acceleration detecting means for detecting an acceleration condition of an automobile and control means for controlling a variable displacement mechanism of said compressor, a method of controlling the operating capacity of a compressor of an automobile air conditioning system comprising the steps of:

operating said compressor;
detecting the air temperature;
comparing said detected air temperature with a first predetermined temperature;
generating a first control signal when the detected air temperature is higher than said first predetermined temperature;
terminating the operation of the compressor if the first control signal is not generated;
comparing said detected air temperature with a second predetermined temperature upon the occurrence of said first control signal;
generating a second control signal when said detected air temperature is higher than said second predetermined temperature;
controlling the variable displacement mechanism of said compressor to reduce the operating capacity of said compressor if said second control signal is not generated;
determining the acceleration condition of said automobile upon the occurrence of said second control signal; and
controlling the variable displacement mechanism of said compressor to reduce the operating capacity of said compressor upon the occurrence of a first acceleration condition.

4. The method of claim 3 wherein said first acceleration condition occurs when said second control signal is generated and the acceleration condition of the automobile is higher than a predetermined threshold.

* * * * *